April 30, 1940.                    J. GARDNER                     2,198,611
                          FARE REGISTERING APPARATUS
                    Filed April 7, 1937              4 Sheets-Sheet 1
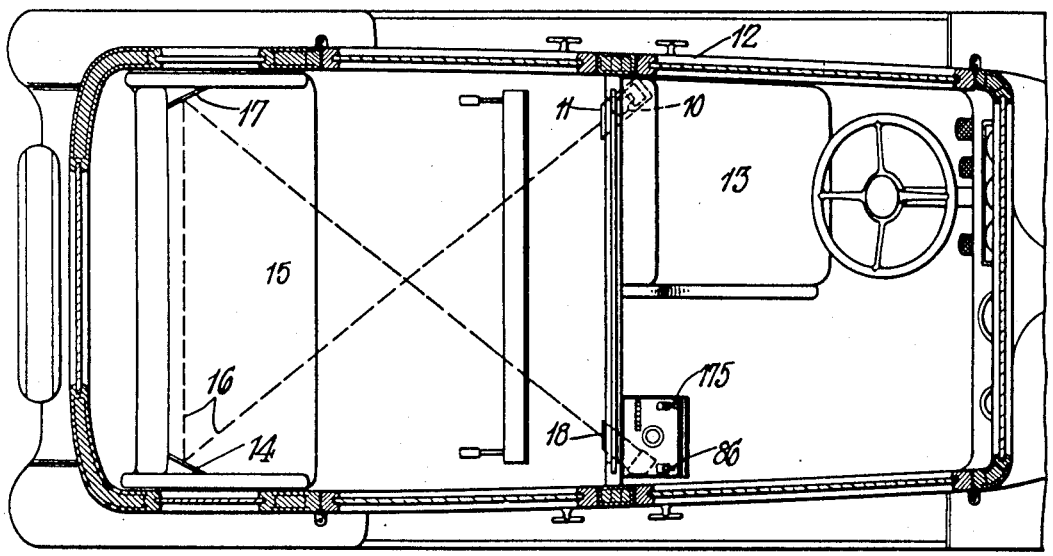
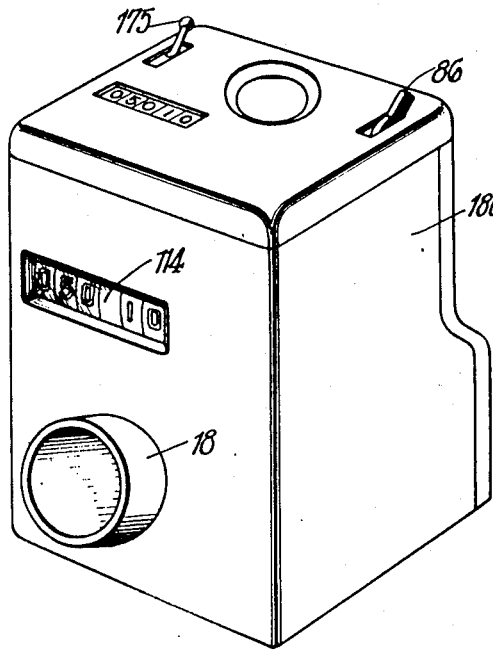 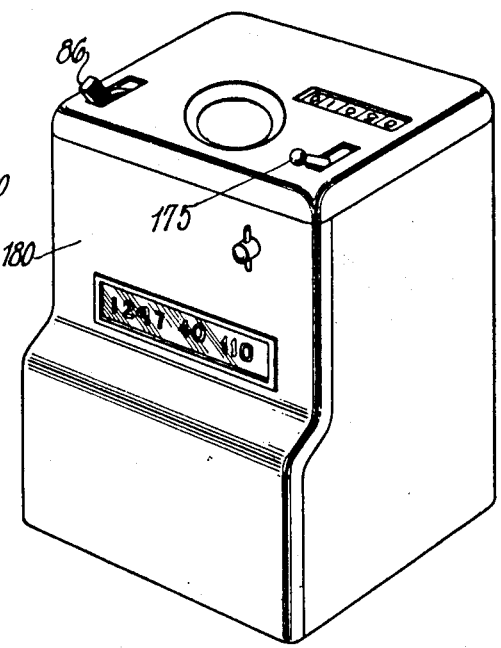
INVENTOR
JOHN GARDNER
BY April 30, 1940.    J. GARDNER    2,198,611
FARE REGISTERING APPARATUS
Filed April 7, 1937    4 Sheets-Sheet 2

INVENTOR
JOHN GARDNER
BY
ATTORNEYS

April 30, 1940.   J. GARDNER   2,198,611
FARE REGISTERING APPARATUS
Filed April 7, 1937   4 Sheets-Sheet 3

INVENTOR
JOHN GARDNER.
BY
ATTORNEYS

April 30, 1940.  J. GARDNER  2,198,611
FARE REGISTERING APPARATUS
Filed April 7, 1937  4 Sheets-Sheet 4

INVENTOR
JOHN GARDNER.
BY
Vanna + Rauber ATTORNEYS

Patented Apr. 30, 1940

2,198,611

UNITED STATES PATENT OFFICE 2,198,611

FARE REGISTERING APPARATUS

John Gardner, New York, N. Y.

Application April 7, 1937, Serial No. 135,388

17 Claims. (Cl. 235—45)

My present invention relates to a fare registering apparatus of the type generally employed in measuring distance and registering the fares of passengers in taxicabs, and generally known as a "taximeter."

Taximeters are generally employed not only to measure the time and distance during which the cab has been employed or occupied by a passenger so that he may know the exact fare to be paid, but also to register the total of all such fares so that the owner of the taxicab may know the total amount of fares collected. When a cab is driven by an employee it is possible in the types of taximeters heretofore used for him to serve a passenger without, in fact, moving the meter to registering position, or to move it only for a period of the service, obtaining compensation from the passenger by an agreement without a record of the fare. When traffic conditions vary greatly as, for example, with changes in the weather, or because of trips to widely different parts of a city, it becomes extremely difficult, if not impossible, to obtain a satisfactory check on the total fares.

This is the more difficult because during certain periods when a cab is engaged by a passenger, it is permissible to place the taximeter in non-registering position, while at other times it is not. For example, if a cab is on call and waiting for a passenger, the driver may place the meter in registering position whereby it will register a charge for each time interval that elapses since, otherwise, the cab may be engaged by another passenger, it being a common rule that a cab must serve any passenger who applies unless the meter is registering. However, the driver need not move the meter into registering position while waiting. Accordingly, if he has made a part of a trip and is waiting for a passenger, who may be shopping or otherwise temporarily engaged, the meter may be moved to non-registering position, whereupon the clock mechanism will not register the time elapsed during such a wait. However, if the cab is in motion and is stopped because of traffic condition, it is commonly not permitted to move the taximeter into non-registering position because the cab is in service.

In my invention I provide a fare measuring mechanism which positively ensures against the cab being operated for a passenger without registering the fare, or places a penalty on the driver for failing to register the fare, and which is proof against tampering but which permits the driver to place the meter in non-registering position under those circumstances where this is permissible.

In my invention I provide a light sensitive element and a light source to direct a beam to said light sensitive means in a path that is intercepted by a passenger occupying the cab. The light sensitive mechanism is so shielded that it is not affected by outside sources of light and is so adjusted to the intensity and quality of the light source that it will not only be affected by the interception of the light beam, but also by a light beam of different quality or intensity whether greater or less than that to which it is adjusted. When the light beam is intercepted or decreased, the current through the light sensitive element diminishes and this serves to actuate a relay mechanism to set in motion the fare registering apparatus. Similarly, if the light beam should be changed or become more intense, the relay will be moved in the opposite direction also to set the registering mechanism in operation. It will be understood that the light rays need not be readily visible; they might be infrared or violet rays. The terms "light-rays" and "light sensitive" are used in this wider sense in the specification and claims. When the relay mechanism is thus actuated it closes a part of a circuit through a motor, the remainder of which is closed immediately upon the starting in motion of the cab. The motor drives a switch which thereafter by-passes that part of a circuit which is closed by the motion of the cab, and thereafter the motor continues to rotate until the switch reaches a position where the motor is cut out of the circuit. This rotation of the motor serves, however, to register the initial charge or "drop." Thereafter the control switch remains in fixed position and the further registering of the fares or "drops" is under the control of a clock mechanism and of a cable driven from the wheel or transmission of the cab.

Preferably there are three fare registering elements, one for the passenger, one for the driver and one for totaling all fares for the records of the owner. The first and last of these is driven mechanically from the clockwork and speed mechanisms. The driver's fare registering device is driven electrically so as to give a periodic advance for each time or distance interval as, for example, one "drop" for each quarter mile, or for each two minutes of waiting. In order to place the fare registering mechanisms in non-registering position, an alternative circuit is provided which, when closed, will stop the action of the clock mechanism, but only when it has completed an interval as, for example, at the end of a two minute interval. When in non-registering position, if the cab should be put in motion, the passenger's and driver's fare mechanisms will be brought to their original position, canceling the fare and starting a new one. Accordingly, the driver would not voluntarily place the meter in non-registering position when driving the cab so that it will not register time intervals during interruptions, such as in traffic, inasmuch as he would lose the part of the fare already earned, while he would be accountable for it on the owner's or totalizing fare registering mechanism. Accordingly, the meter will be placed in non-registering position only when waiting, and must be put into registering position before the cab is again started. Means are also provided for interrupting the light source so as to place the mechanism in registering position under the action of the clock while a called cab is waiting for the passenger.

The various features of the invention are illustrated by way of example in the accompanying drawings, in which—

Fig. 1 is a horizontal section of a cab having a fare register embodying a preferred form of my invention.

Figs. 2 and 3 are perspective views, respectively, from the passenger's and driver's side of the fare register.

Figure 4:
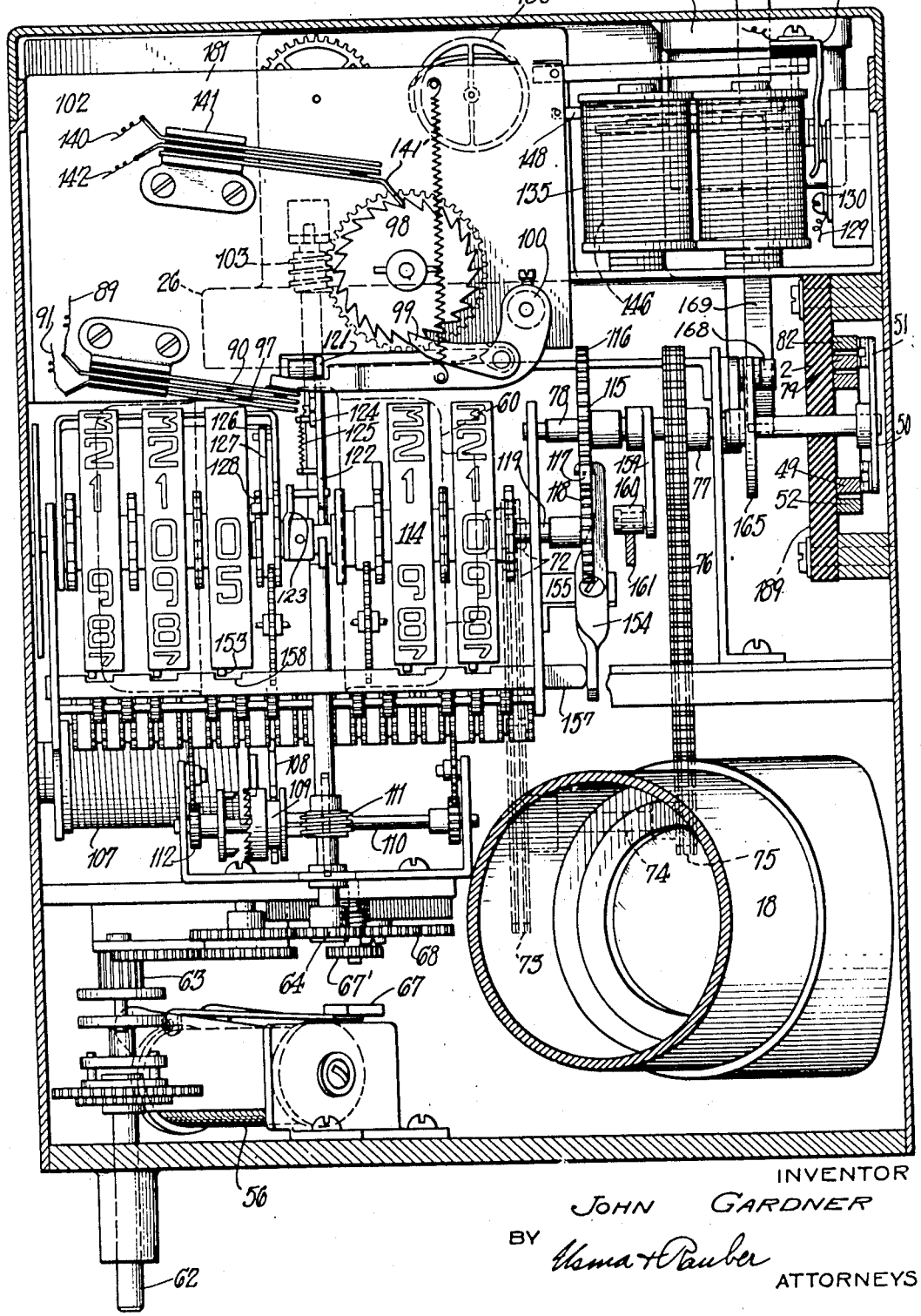
Fig. 4 is a vertical section of the mechanism taken parallel to and just inside of the wall of the fare register box facing the passenger.

In the preferred embodiment of the invention shown in the accompanying drawings, a beam of light from any suitable source, such as an incandescent bulb 10, is directed by a tubular enclosure 11 from one side of a cab 12, for example, near the driver's seat 13, transversely across the cab to a mirror 14. The mirror 14 is so positioned, for example, immediately above the seat 15, as to reflect the ray of light indicated by the dotted line 16 across and slightly above the seat to a mirror 17 on the opposite side of the cab, from whence it is reflected into the tubular shields 18 of a light sensitive element 19 of any suitable type, for example, having a pair of terminals or electrodes 20 and 21. It will be apparent from Fig. 1 that it will be impossible for a passenger to occupy the seat of the cab without interrupting the light beam 16. The light sensitive element 19 may be of any suitable type—either one in which current is generated proportionally to the light received, or in which the resistance of the light element is varied by changes in the radiation received.

The terminals 20 and 21 of the light sensitive element 19 are connected, respectively, to conductor wires 22 and 23 which lead to the terminals 24 and 25, respectively, of a galvanometer type of relay 26. The relay 26 is so adjusted that the amount of current supplied under the influence of the light 10 is just sufficient to hold a swinging contact arm 27 balanced against the tension of a spring 28.

In the event, however, that the beam 16 should be interrupted, or its quantity or quality varied by a small percentage in either direction, the pointer 27 will swing one way or the other to contact with one or the other of a pair of contact terminals 29 and 30, respectively, which are connected by branch wires 31 and 32, respectively, to a conductor 33 of a circuit, the other conductor or branch 34 of which is connected to the swinging pointer 27. One of these wires 34 is connected through a relay 35 to a battery 36, or other source of current, for the fare registering mechanism and for the lamp 10. The relay 35 is inter-connected with the ignition and lights so that the fare registering mechanism cannot be disconnected from the battery without also disconnecting the ignition. It comprises, for example, a solenoid 37 to which current is supplied from the battery through a wire 38 and branch 39, and a pair of switch armatures 40 and 41 which are also connected with the wire 38 and also with wires 42 and 43, respectively, leading to the lights and ignition. The wire 34 is connected by branch wires 44 and 45 to both terminals of the switch 40, and by wire 46 to one terminal of the switch 41, the other terminal of which is connected by wire 47 to the ignition system. It will be understood that the relay 35 is shown only by way of example and that any suitable mechanism may be employed to guard against the operation of the cab when the fare registering mechanism is disconnected.

It will be apparent, therefore, that whenever the needle 27 of the relay 26 swings to either terminal 29 or 30, current passes from the battery 36 through the wire 38, switch armature 40 wires 45 and 34, relay 26, pointer 27 and either terminal 29 or 30 to the wire 33 which leads to a switch device 48 having a terminal 49. The switch 48 has a rotating connector arm 50 which may take the position indicated in broken line identified as I. In this position a connecting element 51 spans the distance between the terminal 49 and a second terminal 52. The terminal 52 is connected by a branch wire 53 to a conductor 54. The conductor 54 is connected to a number of branch circuits that are to be energized when the connector arm 50 is in starting position. One branch 55 leading from the conductor 54 connects through a grounded solenoid 56 and also to the rim 57 of an intermediate contact device 58. The solenoid 56 and contact device 58 are so related that when the solenoid is energized and the cab put in motion, current is supplied from the main 54 to a main 59 that supplies a motor 60 through a branch line 61. On the other hand, when either the solenoid 56 is not energized or the cab is not in motion, the conductors 54 and 59 will be disconnected. For this purpose the solenoid 56 serves to slide pinion 67' into engaging position with gear 66 to connect the rotating mechanism 68 to the speedometer cable 62. Cable 62 drives gearing 63 of known construction and arrangement, to drive a driven gear 64 on the end of a drive shaft 65 in a single direction regardless of the direction of rotation of the cable 62.

The gearing 63 may be of any suitable type as, for example, comprising a pair of oppositely driving pawls and ratchets transmitted through suitable gears to the pinion 64. The pinion 64, in turn, drives an idler 66 which rotates freely when the pinion 67' is in the lower position indicated in full lines in Fig. 6. When the solenoid 56 is energized, however, it rotates a bell crank lever 67 counter-clockwise to lift a shifting pinion 67' to mesh with the idler 66 and the pinion 68 driving the latter. The gear 68, in turn, drives a shaft 69 which extends upwardly into the intermittent contact element 58 and rotates a star wheel 70. The star wheel 70 is insulated from the circumferential terminal 57. It engages a spring pressed pawl 71 so that as it rotates, it pushes the pawl 71 intermittently outwardly into contact with the conductor rim 58, thereby connecting the conductor 54 with the conductor 59 and starting the motor 60 into rotation. The rotation of the armature of the motor 60 is transmitted by a chain 72 and pulley 73, shaft 74, pulley 75, belt 76 and pulley 77 to a shaft 78 upon which is mounted the rotating switch arm 50. The initial rotation of the motor, therefore, immediately partially rotates the arm 50 clockwise, bringing it to the position indicated at II in broken lines. This interrupts the connection between the terminals 49 and 52.

However, a second or by-pass connection through the motor is established from the conductor main 38 and branch 39 connected to a circular terminal 79 slightly spaced angularly from the terminal 49, but in the same circle of curvature. The bridging section 51 of the rotating arm 50 thereupon connects the terminals 79 with a terminal 80 separated and insulated from the terminal 52, but in the same circle of curvature. From the terminal 80 current is conducted through a branch wire 81 to the wire 59 and thence to the motor. The interruption of the current to the wire 54 de-energizes the solenoid 56 which is no longer necessary, as it is by-passed by the wire 81. Pinion 67' drops from engagement with gear 66. The motor 60, accordingly, is driven until the arm 50 reaches the position shown in full lines in Fig. 6, whereupon the connection to the motor is broken. However, when the switch arm 50 is in full position the source of current 36 is connected through the branch wire 39, terminal 79 and connecting element 51 to a terminal 82, from which the wire 83 leads to a pair of terminals 84 and 85 of a switch 86 known as a "non-registering" switch, as it enables the apparatus to be put in a condition in which waiting time will not be registered. The switch 86 may be moved alternatively into one of two positions, in one of which the fare registering mechanism is in operative or registering condition, and in the other of which it is in non-registering condition. In registering condition, as shown in full lines in Fig. 6, a sliding switch element 87 connects the terminal 85 to a terminal 88 of a conductor wire 89 which leads to one terminal of an intermittent contact element 90, the other terminal of which is connected to a return wire 91 and a terminal 92 of the switch 86. From the terminal 92 current is conducted through a sliding switch member 93 to a terminal 94 thence through a conductor wire 95 to a solenoid 96, and thence to ground.

Figure 6:
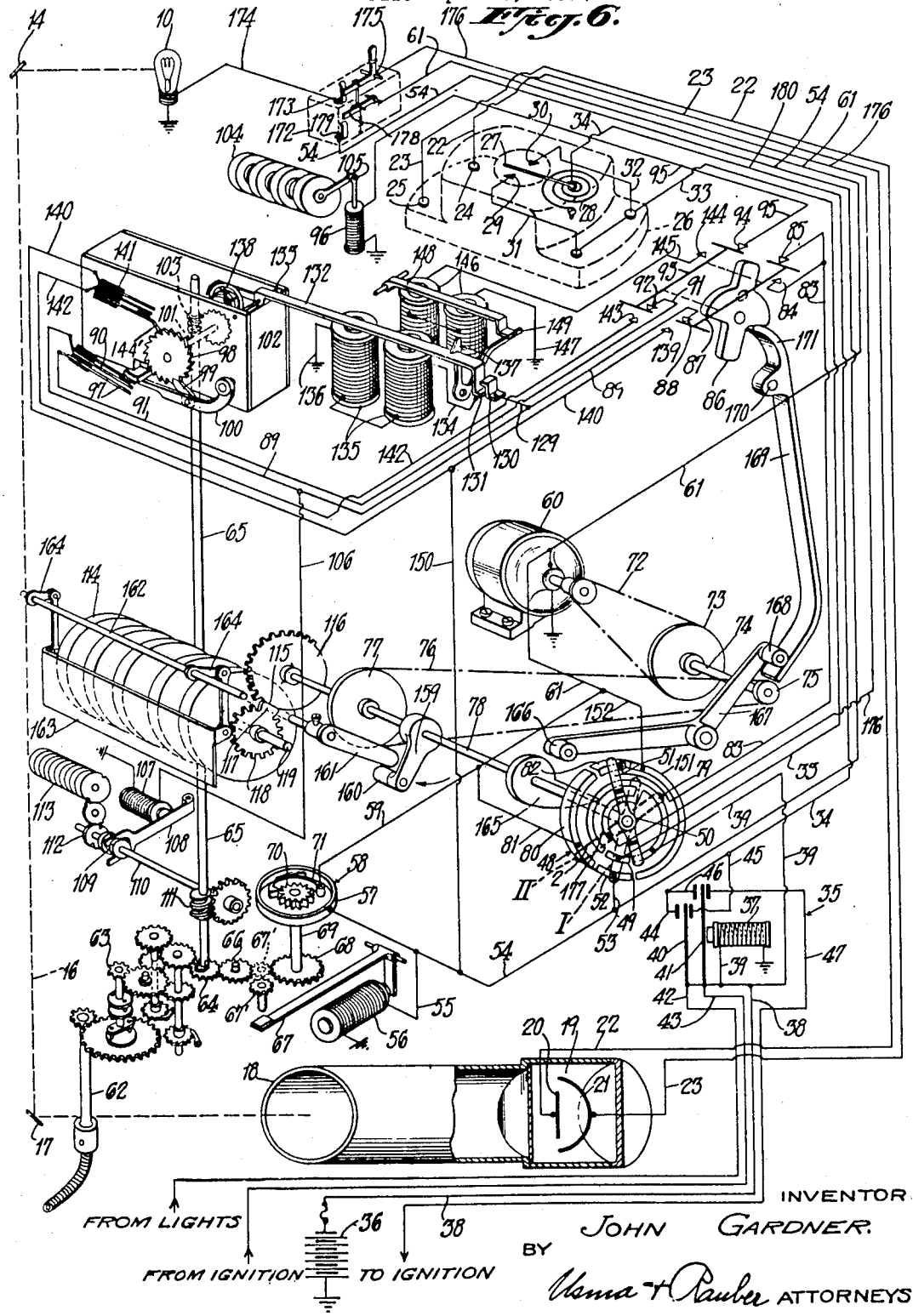
Fig. 6 is a diagrammatic perspective showing the various parts of the mechanism in their proximate spacial relation, but spaced to provide against the obscuring of one part by another.

The intermittent switch element 90, as shown in Figs. 4 and 6, has a pair of contact springs 97 connected to the wires 89 and 91 and brought into and out of contact with each other by the rotation of a ratchet wheel 98 through the action of a follower pawl 99 and lever arm 100 which bears against one of the springs 97. The ratchet wheel 98 is mounted on a shaft 101 which is driven by a clock mechanism 102 when the cab is not in motion or, from the speedometer shaft 65 through a worm and gear mechanism 103 when the cab is in motion. Any suitable mechanism may be employed to drive the shaft and the ratchet wheel 98 selectively by the clock or speedometer cable, and this mechanism is indicated only diagrammatically in the drawings. The speed at which the ratchet wheel 98 is driven is so adjusted that one tooth will move past the pawl 99 for each time interval, for example, two minutes, or each distance interval, for example, one quarter of a mile, so that the circuit between the wires 89 and 91 will be closed through the switch 90 at each such interval, and will thus energize and de-energize the solenoid 96 at each interval. With each energizing and de-energizing of the solenoid 96, a fare register 104, which may be designated the "driver's register" is advanced a unit by means of a crank arm 105.

When the conductor 89 is energized, current is also supplied through a branch wire 106 to a grounded solenoid 107, the armature 108 of which actuates a clutch 109 on a shaft 110 driven from the cable shaft 65 through the worm gearing 111. Thereupon the shaft 65 is clutched to the gear 112 of a totalizing fare registering device 113. A fare register 114 is also provided in position to be visible to the passenger, as indicated in Fig. 2. This fare register is given a movement to starting position by the shaft 78 that rotates the rotating switch arm 50.

In the starting position of the register 114, all of the registering discs will have been brought to an aligned position. This may be accomplished by any suitable aligning mechanism as, for example, by having the discs rotatably mounted on a grooved shaft and provided with pawls that are engaged by the shaft so that a complete revolution of the shaft would bring the discs all to an initial aligned position from which they are driven forward on the shaft by the driving mechanism. If there is no initial charge the discs would indicate zero, but if there is an initial charge as, for example, a starting charge of fifteen cents, then the first two discs would indicate this amount in their starting position so that the starting position would then indicate 15 insead of zero, this being merely a matter of placing the markings on the discs.

In the position of the rotating switch 50 shown in full lines in Fig. 6, a smooth sector 115 on a mutilated gear 116, rigidly fixed on the shaft 78, engages and slides on a complementary segment 117 of a smaller gear 118. This is the position that these gears occupy when the registers start and while the registers are operating. When the arm 50 rotates forwardly in a clockwise direction, the smooth sector 115 rotates away from the segment 117 and the teeth of the gears 116 and 118 mesh and rotate the shaft 119. The number of teeth in the gears 116 and 118 are the same so that a complete revolution of the gear 116 will cause a complete revolution of the gear 118, the smooth sector 115, permitting the gear 118 to rotate while the gear 118 is held stationary throughout a considerable part of the initial movement of the shaft 78 from the full line position of arm 50 shown in Fig. 6. When the arm 50 has rotated to the full line position shown in Fig. 6, one complete revolution of the gear 118 and the shaft 119 will have been made. The gear 118 has some freedom or range of movement while the gear 118 and the shaft 119 are held stationary. This insures that the shaft 119 shall stop exactly at a fixed position even though the position of the shaft 78 should vary. From this position with the initial charge indicated on the first two discs, the discs are rotated forwardly on the shaft 119 by a mechanism controlled by the ratchet wheel 98. This mechanism comprises a swinging bell crank lever 120 (Fig. 5) which is pivoted so that its horizontal upper arm 121 overlies the end portion of the lever 100, while the depending arm 122 slotted to receive a pin on a rocking arm 123 rotatably mounted on the shaft 119 of the fare register 114.

Figure 5:
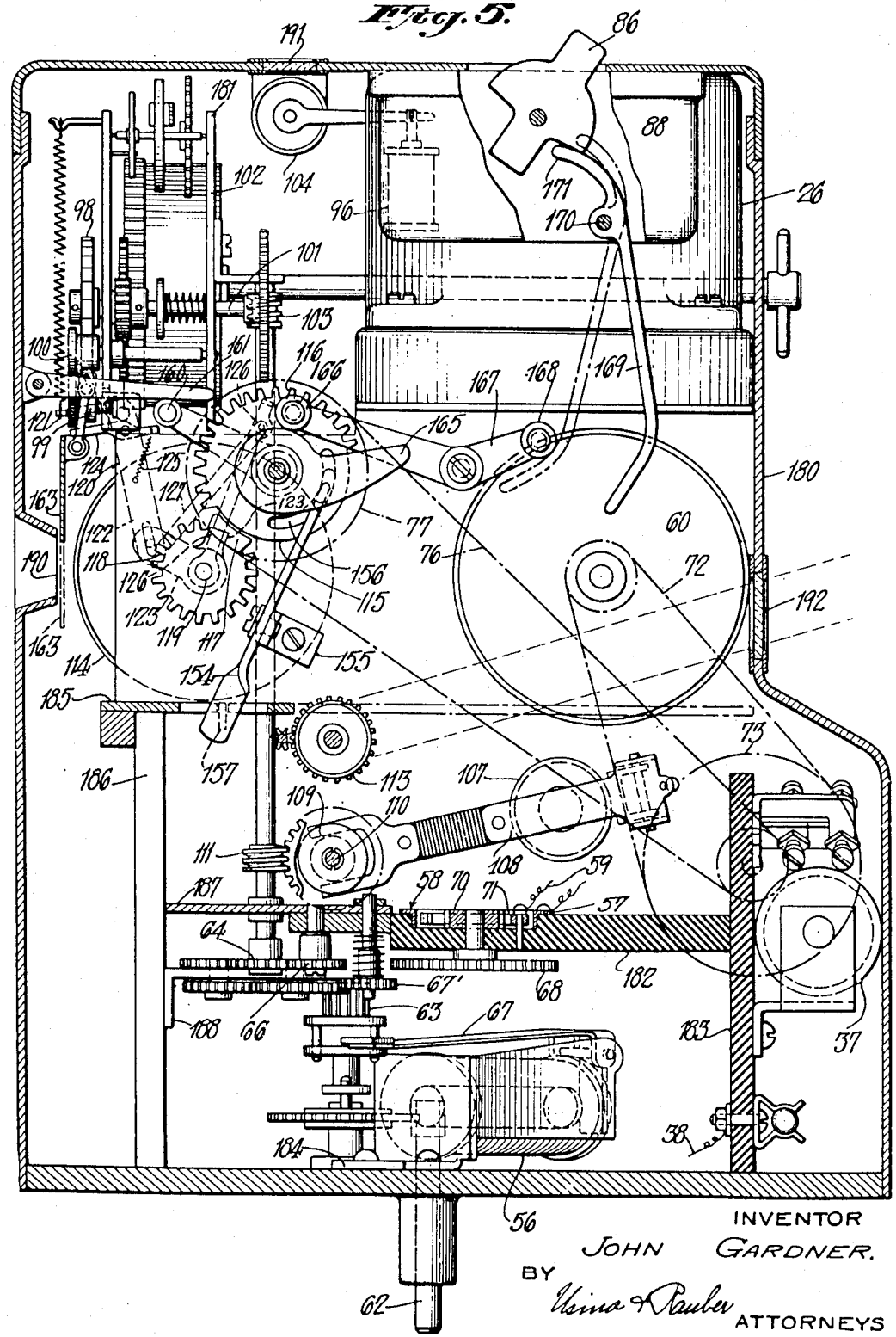
Fig. 5 is a vertical section through the interior of the fare register box taken at a right angle to the section of Fig. 4.

It will be apparent, therefore, that with each upswing of the pawl 99 and lever 100 the bell crank lever 120 will be swung to the position shown in Fig. 5. To swing it counterclockwise, a lever 124 is mounted on the upper part of the depending arm 122 of the bell crank lever 120 and is drawn upwardly against the lower surface of the lever 100 by means of a spring 125. With each up and down movement of the lever 100, therefore, the rocking arm 123 is swung back and forth. This motion is transmitted to a bail shaped element 126 to which is attached a pawl 127 which engages and moves a ratchet wheel 128 a distance of one notch or "drop" for each complete swing. It will, therefore, be apparent that the initial digit wheel of the fare register 114 is rotated one "drop" each time the wheel 98 moves through an angle equivalent to one ratchet tooth. Briefly, therefore, every time the wheel 98 rotates a distance equal to one tooth of its ratchet it depresses and then releases the lever 100 thereby closing and immediately opening the contact terminals 97. At the same time the lever 100 being between the arm 121 of the bell crank lever and the lever 124 attached thereto, it swings the bell crank lever 120 back and forth; this in turn rocks the arm 123 and the bail 126; this in turn moves the pawl 127 back and forth a distance equal to one notch of the wheel 128; this in turn moves the initial digit or indicating wheel of the register 114 a distance equal to one "drop", or equal to a change of five cents, in case the fare progresses in five cent intervals.

It will be noted that the arm 124 is held by a spring 125 tightly against the bottom edge of the lever 100 so that the lever 100 is thus closely engaged between the lever 124 and the horizontal arm 121 of the bell crank lever 120. The effect is the same as though the arms 121 and lever 124 were a bifurcated horizontal arm, except that the lever 124 and spring 125 always maintain a close connection with the lever 100, even after considerable wear and thus prevent lost motion or any chattering or loosening in the operation of the apparatus.

The clock mechanism 102 is so controlled that it is free to move only when the wire 89 is connected to the source of current i. e. when switch 86 is in Fig. 6 position and arm 50 in full line position, Fig. 6. When thus connected, current flows from the wire 89 through a branch wire 129 which terminates in a terminal 130 having a horizontal upper shelf against the lower surface of which bears a horizontal flange 131 of a lever 132 pivoted at 133 on the clock mechanism 102. The flange 131 is insulated from the lever 132 and is connected by a wire 134 to solenoids 135 from which the current passes to ground through a wire 136.

Current passing from the wire 129 through the solenoids 135 energizes the latter and swings the arm of the lever 132 downwardly until the terminal plates 130 and 131 separate as in Fig. 6. The arm of the lever 132 is, however, engaged by a latch 137 having a hook shaped end that engages the upper surface of the lever 132. When the end of the lever 132 is thus depressed, the opposite end is raised to release an escapement 138, releasing the clockwork. In other words, normally the opposite end of the lever 132 rests against the escapement wheel 138 preventing it from moving and thereby stopping the clock mechanism. However, when the solenoids 135 attract the lever 132 they lift the opposite arm of the lever from the escapement and the clock mechanism resumes its movement driving the shaft 101 and ratchet 98.

It will be understood that the shaft 101 is driven from both the shaft 65 and the clockwork mechanisms 102 through the usual overriding mechanism which permits the faster of these mechanisms to drive the shaft 101. For example, if the charge per hour is $2.00, the clockwork will drive the shaft 101 until the cab is started and reaches a speed sufficient to drive the shaft at a higher rate. If the rate is five cents a quarter mile, the shaft 65 will drive the shaft 101 when the speed reaches 10 miles an hour. This mechanism being the usual one in clock and speedometer driven motors, is not shown in detail in the accompanying drawings.

When the driver wishes to place the meter in non-registering condition so that it will not register the time interval spent in waiting after it has been run for an initial distance or period of time, he swings the switch 86 to the left of Fig. 6. Thereupon the connection through the sliding element 87 between the terminals 85 and 88 is broken, as is also the connection between the terminals 92 and 94 through the sliding connector 93. At the same time, however, contact is made through the connector 87 between the terminal 84 and terminal 139 which is connected to wire 140. The circuit of the wire 89 is, therefore, opened, and the wire 140 closed or connected to the source of current through the wire 83 and the terminal 82. The wire 140 leads to a spring switch element 141 mounted on the clockwork 102 and having a spring element 141' that is engaged and vibrated by the teeth of the ratchet wheel 98 so as to close the circuit and open it through the switch element 141 with the passage of each tooth of the ratchet wheel 98.

When the circuit is temporarily closed through the switch 141, the current returns through a return wire 142 to a terminal 143 which is connected by the sliding connector 93 to a terminal 144. The terminal 144 is connected by a wire 145 to a pair of solenoids 146 and thence to ground through the wire 147. When the solenoids 146 are energized they depress a pivoted armature 148 which depresses the free end 149 of the latch 137, thereby releasing the lever 132 so that it may engage the escapement 138 and stop the clock mechanism 102. It will be apparent, however, that the solenoid 146 cannot be operated and the clock stopped until it has completed any part of a movement from one tooth length of the ratchet wheel 98, and thus completed any "drop" interval that may have been started.

When the switch 86 is in non-registering position, i. e., to the left from Fig. 6 position, and the cab stationary, all of the elements of the meter remain stationary except that current flows from the line 140 through branch wire 150 to the line 54 and thence through the branch wire 55 to the solenoid 56 and ground. The solenoid 56 being energized, swings the lever 57 to lift the pinion 67' into the raised position so that if the cab be put in motion, the switch element 58 rotates temporarily, closing the circuit from the wire 54 to the wire 59 and thence through wire 61 to the motor 60. Thereupon the shaft 78 and the rotating switch arm 50 are driven clockwise from the full line position of Fig. 6 until the arm 50 contacts with a terminal 151 and connects the latter to the terminal 78.

Thereupon the circuit is closed from the wire 38 through a branch wire 152 to a wire 61, thus by-passing the solenoid 56 and the rotating element 58 and giving a direct circuit from the supply main 38 through branch 39 to the motor. The rotation of the motor thereupon continues until the arm 50 reaches its original position spanning the terminals 49 and 52. The effect of this rotation of the motor is two-fold. First, it cancels the fare registered on the register 114 and places the register in position to start a new registration upon the entrance of a new passenger. However, the original fare is registered on the totalizing register 113. As a result, the driver zeroizes the fare which has been canceled, but must include it in the total run. A second effect is to return the non-registering switch to registering position. The first effect, or cancellation of the charge on the register 114 is accomplished by the gear 116 meshing with the gear 118. As this gear rotates it rotates the shaft 119 on which the digit wheels are mounted, picking up each digit wheel by a groove on the shaft which engages a ratchet on the digit wheel and carries each digit wheel with it to its initial position. As this construction is old and well known in the art as one of a number of mechanisms for operating the digit wheels, it is not illustrated in detail in the drawings. It will be understood that other types of wheel or disc operating mechanism can be employed. Each of these digit wheels is provided with a stopping peg 153, Fig. 4. At the beginning of this movement of rotation, a pivoted lever 154, Fig. 4, mounted on a side bracket 155 of the register 114 passes out of a depression 156, Fig. 5, and thus swings the lever in a clockwise position viewed as in Fig. 4. The lower end of the lever 154 thereupon engages and shifts to the left a notched stopping bar 157 so that the notches 158, which have previously cleared the stopping peg 153, are shifted and the pegs are stopped from overriding by the bar 157 when they reach zero position. Thereupon, further movement of the gear 116 permits the bar 157 to return to its original position so that a new registering can take place.

At the same time a crank arm 159 on the shaft 78 is rotated so as to bring an end roller 160 into engagement with a crank 161 on a rock shaft 162 so as to rock the latter and thus lift and lower a curtain 163 suspended from cranks 164 on the shaft 162 when the register wheels are returned to zero position. In the position of the apparatus shown in Fig. 6, the curtain is in lowered position to give a view of the register, and the arm 159 approaches a position to raise this curtain. When the switch arm 50 rotates from the full line position shown in Fig. 6, the crank arm 159 first lifts the arm 161 and raises the curtain, the parts being so proportioned that this curtain will remain raised until the previous fare has been cancelled and the registering discs or digit wheels are returned to their initial position, whereupon the roller 160 will pass beyond the end of the arm 161 and permit the latter to drop, dropping the curtain and showing the initial fare and all subsequent fares. Thereupon, the fare registration is cancelled and the new fare registering started on the register 104 by mechanism (not shown) identical with, or similar to, that of the fare register 114. This registering mechanism may be run from the common shaft 74, and is omitted solely for the purpose of avoiding complication of the drawings.

In rotating from the position shown in Fig. 6, the cam 165 keyed on the shaft 78 serves, through the leverage shown in Fig. 6, to return the non-registering switch 86 to registering position in case it has not been returned by the driver before the rotating arm 50 has again rotated to the position shown in Fig. 6. In the position shown in Fig. 6, a roller 166 on a bent rocking lever 167 rests on the hub or smaller part of the cam 165 and, in this position, a roller 168 on the opposite arm of the lever bears against the lower bent part of a second bent lever 169 pivoted at 170, and having an upper shorter extension 171 that bears against a tail of the switch 86. When the shaft 78 rotates to such a point that the enlarged or cam face of the cam 165 bears on the lower part of the roller 166 and raises it, it rocks the lever 167 clockwise as in Fig. 6, lowering the roller 168 on the opposite end and permitting the lever 169 to rotate or swing counterclockwise for a short distance. The upper bent arm 171 of the lever 169 is thus swung downwardly against the tail of the switch 86 and swings it to recording position. The cam 165 is preferably so fixed on the shaft 78 that it will return the non-registering switch 86 from the non-registering to the registering position just before the arm 50, and returns to the number I position. The cam 165, therefore, ensures that the meter shall always start in a registering condition.

It will, therefore, be apparent that it will be impossible for the cab to be driven in non-registering position because it will immediately cancel any charge on the passenger's meter without cancelling it from the totalizing meter, and will then return to registering position.

In some cases a cab may be called for a certain period and kept waiting for a passenger. To prevent being engaged by other prospective passengers, the meter must be started. This is accomplished by means of a switch 172 which, in its usual position, closes a circuit between a terminal 173 which connects through a wire 174 to the lamp 10 and to ground, and a second terminal 175 which is connected through a wire 176 to a terminal 177 which is in contact with the rotating switch arm 50 when the latter is in starting position, and through which it is connected to the wire 39 and thence to the source of current 36. When in this position, therefore, the light will be in a closed circuit and lighted. To start the registering mechanism the driver moves the switch 172, breaking the circuit between the conductors 174 and 176, extinguishing the light and also closing the circuit between the terminal 178 of the wire 61 leading to the motor 60 and terminal 179 of the wire 54 which is, at this time, connected across the terminals 49 and 52 to the wire 39 and the battery 36.

Accordingly, the motor 60 rotates even though the cab remains stationary and the sequence of operations follows until the arm 50 reaches the full line position of Fig. 6. In this position and with the switch 86 in registering position, the solenoids 135 are energized, as described above, and the armature 132 lowered to free the clock mechanism which then begins registering the fare. It will be understood that at any time thereafter the switch 86 may be placed in non-registering position at the option of the driver. However, as previously described, it will be necessary for the driver to put it in registering position before starting the cab, or to be penalized by the fare already registered.

The meter may be mounted in any suitable manner in a suitable case; for example, it may be mounted in a case 180 to which may be attached a frame 181 for supporting the clockwork mechanism. The driving mechanism and the intermittent switch 57 may be mounted on an insulating horizontal platform 182 supported by a vertical platform 183 on which the solenoid 37 and associated mechanisms are mounted. The solenoid 56 may be mounted on a bracket 184 on the base of the casing 180. The passenger's fare registered may be mounted on a horizontal platform 185 supported on an upright 186, and may also have brackets 187 and 188 to support the gearing 63 and 64. The switches 26 and 86 may be supported from the top wall of the casing and also the solenoid 96 and the driver's meter 194.

The rotating switch 50 and its contacts may be mounted on a vertical insulating slab 189 secured to a side wall of the case. The case may be provided with openings or windows as at 190, 191 and 192 through which the various fare registers may be viewed. It will be obvious, however, that the various parts of the meter may be embodied in any suitable casing.

It will be apparent, therefore, that when the radiation from the source 10 to the sensitive element 19 is interrupted or modified, it will partly close a circuit which will be completely closed by the intermittent switch 58 when the cab is started. This will place both the clockwork and cable driving mechanisms in operative position to register fares. The operation of the clockwork may be stopped by the manual switch 86 but, if the cab be then started, the rotating switch 50 returns to its starting position and, if the cab is still occupied and in motion, it will begin the registration of a new fare, the previous one having been cancelled from passenger's fare meter. This will also return the switch 86 to registering position.

Résumé

In résumé, it will be observed that the shaft 78 not only carries the rotating arm 50 of the control switch but also the gear 116, the shutter crank 159 and the cam 165 for returning the non-registering switch to registering position, and that when the shaft 78 rotates from and back to the position shown in Fig. 6, it will rotate the toothed part of the gear 116 in mesh with the gear 115 to give the latter one complete revolution and then to hold it in a rigidly fixed position, with the parts 117 and 118 in contact. This serves to move all of the digit discs or wheels of the fare register 114 to initial position through a pick-up engagement with the shaft 119. During this rotation of the shaft 78 to initial position, the crank arm 159 lifts the lever 161, rocking the shaft 162 and arms 164 and lifting the curtain 163. When the shaft 78 reaches the position shown in Fig. 6, the arm 161 will fall, thus lowering the curtain 163 and exposing the digit discs. It will be apparent that the curtain 163 may be arranged to shut out the digit discs of the register 114 either in raised or lowered position by a simple re-arrangement of the rocking arms 164, it only being essential that the digit discs of the register 114 be covered from view while they are being returned to their initial registering position, so that no fare indication will be exposed at this time. Meanwhile the cam 165 will have made a complete revolution, rocking the lever 167 clockwise causing the lever 169 to rock counter-clockwise as viewed in Fig. 6, and thus throwing the switch 86 clockwise to registering position.

The rotation of the shaft 78 is controlled by the switch arm 50 through the following circuits: Electric current is conveyed from the battery 36 through the relay 35 through which there is always a connection to the lines 34 and 39, this relay being solely for the purpose of ensuring that the meter cannot be disconnected without disconnecting the ignition, etc., and thereby ensuring that the cab cannot be run if the meter is disconnected. When the arm 50 is in position I in Fig. 6, current flows from the line 34 to the swinging arm 27 of the switch 26. If this arm 27 is in intermediate position, which is the case when the cab is unoccupied and the light beam 18 uninterrupted, the switch arm 50 remains in position I. During this period the running of the cab may be done without registering on the total fare register. However, if the pointer 27 swings either to the right or left, it closes the circuits between the wire 34 and the wire 33 and thus connects the battery to the terminal 49 of the switch. Thence current flows through the connecting arm or part 51 through the wires 54 and 55 and solenoid 56, and also to the rim 57 of the element 58. The energizing of the solenoid 56 raises through the lever 67 the gear 67' and thus connects the gear 68 and shaft 69 to the gear mechanism driven by the meter cable 62. This has no effect so long as the cab remains stationary. However, as soon as the shaft 69 is rotated from the cable 62 through the gear 67', it causes contact intermittently between the rim 57 and the terminal 71, and thence through the wires 59 and 61 to the motor 60. The latter is then started, rotating the shaft 78 through the pulley drive 72—77 to rotate the arm 50 in a clockwise direction. The immediate effect of this rotation is to bring the arm 50 into the position indicated at II in Fig. 6. Thereupon electric connection to the wire 54 is broken and the solenoid 56 is de-energized. However, a second circuit is established from the wire 39 to the terminal 79 and thence by the bridge piece 51 to the terminal 80, from whence the current flows through the wires 81 and 61 to the motor 60 which thus continues in motion. During this period the current may still flow through the switch 26 to the terminal 49, but this has no effect and the motor will still continue to rotate whether or not the switch 26 is open or closed. The motor rotates until it reaches the position shown in full lines in Fig. 6. In this position when the registering switch 86 is in registering position, a circuit is established from the wire 39 through the terminal 79, bridge piece 51, terminal 82 and wire 83 to the terminals 84 and 85 of the registering switch; thence through the switch to the wire 89, intermittent switch 90 and wire 91 back through the terminal 92, switch part 93, terminal 94 and thence through the wire 95 and solenoid 96. Meanwhile a branch 106 leads to the solenoid 107 which throws the clutch connecting the fare odometer 113 to the shaft 65.

Another branch circuit 129 connects temporarily through the contacts 130 and 131 to the solenoid 135 which, upon energizing, depresses the lever 132. The circuit through the contacts 130 and 131 thus broken by the lever 132 is then held open by means of lever 132 being held in its depressed position by the latch 137. With the parts in this position, the clock mechanism 102 will drive the shaft 101 and the toothed wheel 98, or, if the shaft 65 rotates above a certain speed, it will rotate the shaft 101 and toothed wheel 98 and, therefore, the shaft 101 is rotated either by the clock mechanism 102 when the shaft 65 is rotating at a slow speed or standing still, or by the shaft 65 when the latter is running at a sufficiently high speed. The rotation of the ratchet 98 intermittently makes and breaks contact through the switch 90 and alternately energizes and de-energizes the solenoid 96, thus driving the fare register 104 one drop for each make and break. At the same time, the digit wheels or discs of the fare register 114 are driven step-by-step and at the same rate by the levers 100 and 120 and the bail 126 (Fig. 4).

When the switch 86 is swung to non-registering position, as, for example, when a fare temporarily leaves the cab and it is desired that the waiting time shall not be registered, or when the fare has completed the trip and it is desired to cancel the reading on the register 114 it disconnects the circuit through the wires 89 and 91 and establishes a circuit through the wire 140, contact switch 141 and wire 142, the circuit flowing thence from the terminal 84 through the switch contact element 87 to the terminal 139 of the wire 140 and from the terminal 143 of the wire 142 through the switch element 83 to a terminal 144 and thence down solenoids 146. Current then flows through the switch 141, which is opened and closed intermittently by the toothed wheel 98, through the wire 142 and terminal 144 to a wire 145 leading to the solenoid 146 and energizing the latter. The energizing of the latter releases the latch 137, permitting the arm 132 to swing upwardly and engage the clock mechanism to stop the same. As the wires 89 and 91 are disconnected from the electric circuit, the solenoids 135 are not energized and the armature lever 132 remains lifted. At the same time the branch line 150 leads from the wire 140 to the solenoid 56, thus energizing the latter and lifting the gear 67'. The parts will remain in this position so long as the cab remains standing and there is, therefore, no recording of time on the fare register 114. Should the cab be started in this position, however, the solenoid 56 being energized, current will be established from the wire 54 through the contact element 58 and wire 59 to the motor 60, rotating the latter. Upon the rotation of the latter, therefore, the arm 50 will swing clockwise until it bridges the contacts 151 and 79. This short circuits the element 58 and establishes a direct circuit from the wire 39 through the terminal 79, bridge piece 51 and terminal 151, wire 152 and motor 60. The motor therefore continues to rotate until the arm 50 reaches the position indicated at I. If the cab is then unoccupied and the pointer 27 of the switch 26 is in mid position, no further fares will be recorded. However, if the light beam 16 is interrupted, the cycle will begin again, as described above, starting with number I position. The driver of the cab, therefore, must return the switch 86 from non-registering to registering position before starting the cab unless the trip of his fare has been completed. Otherwise, he will be penalized by the loss of his fare, which has been cancelled on the register 114, but remains recorded on the total fare register 113. The switch 86 is therefore usable when waiting without registering, but cannot be used to disconnect the meter from registering fares while running, nor while the cab is interrupted or stopped for short periods, such as for traffic lights. The switch 175 acts only to interrupt the light 16 when a cab starts waiting out a call without having registered any mileage.

As an example of a typical use of the apparatus, assume that a cab is cruising with the arm 50 in the I position of Fig. 6 and that it is hailed by a passenger who enters. Immediately the light beam 16 is broken interrupting the circuit through the wires 22 and 23 and causing the pointer 27 to swing and make contact with one of the terminals 29 or 30. Thereupon a circuit will be closed from the wire 34 which is connected to the battery 36, through the switch 26, the return wire 33, terminal 49 and arm 50, terminal 52, wires 53 and 54 to the mechanism 58 and also to the branch wire 55 and the solenoid 56, thus lifting the gear 67' into engagement with the pinion 66 and 68. The registering mechanism remains stationery until the cab moves, whereupon a circuit is established temporarily and intermittently from the mechanism 58 through the wires 59 and 61 to the motor 60. The motor 60 thereupon rotates the arm 50 clockwise through the transmission 72—77 and shaft 78. This rotation continues until the arm 50 reaches full line position, Fig. 6. During the rotation of the arm 50 and shaft 78, the teeth of the gear 116 will have meshed with the teeth of the gear 118 and will have rotated the latter throughout a complete rotation thus canceling any previously registered fares and zeroizing all the digit wheels of the register 114. In this position also a circuit is established from the wire 39 through the terminal 79, arm 50, terminal 82, wire 83, switch 86 and wires 89 and 91 through the intermittent switch 97 and then again through the switch 86 and wire 95 to the solenoid 96. A circuit will have been established also from the wire 89 through the branch wire 129 through the solenoids 135, depressing the lever 132 and locking it. Thereupon the registers 114, 113 and 104 are driven from the shaft 62 and/or clock mechanism 102. If the cab stops for a considerable period of time the driver may throw switch 86 to non-registering position whereupon a circuit will be established through the solenoids 146 thus unlocking the armature 132 and stopping the clock mechanism. If he throws the non-registering switch 86 back to registering position he will re-establish a circuit through the solenoids 135. During the waiting period the arm 50 will remain in full line position of Fig. 6 indicating that the cab is occupied. However, when the switch is in non-registering position a circuit is established through branch wire 150 to intermittent mechanism 58 and thence to the motor 60 and is also established through the solenoids 56. Should the cab be started with switch 86 in non-registering position the movement of the cab will establish intermittent current through motor 60 starting it and causing arm 50 to swing to a position to bridge terminals 151 and 79 thereby short circuiting the intermittent device and establishing circuit from wire line 39 through the motor 60. Thereupon the latter will rotate until arm 50 reaches I position of Fig. 6. Should the cab be occupied immediately after one occupant has left it and just after the switch 86 has been thrown to non-registering position the mechanism will start from this position and rotate continuously through I and II positions of Fig. 6 to full line position. If the cab is unoccupied the arm 50 will rotate to I position and remain there until occupied. The gears 116 and 118 may be designed to cancel the previous fare at any time in the rotation of the arm 50 clockwise from and back to full line position of Fig. 6. However, in the mechanism shown by way of example in the drawings the previous fare is cancelled and register 114 brought to zero position as the arm 50 rotates from I position to the full line position of Fig. 6.

It will be apparent that various changes could be made in the apparatus and the relation of the various parts. For example, the relation of the clutch arm 108 and solenoid 107 could be reversed so that the arm 108 would be urged to clutching position by a spring, and would be released by the de-energizing of the solenoid 107, the circuit being so arranged that it would be opened and closed in reverse relation to that shown in Fig. 6.

What I claim is—

1. A meter of the type described having clockwork and distance driving mechanisms and registering mechanisms, control means to place said clockwork and distance driving mechanisms in operative relation to said registering means, and comprising an electric circuit having two normally open switches in series, one switch being closed by said distance driving mechanism when in operation, light sensitive means to control the other of said switches, and means to pass light rays through a predetermined path to said light sensitive means.

2. A meter of the type described which comprises a fare registering odometer, a driving means for said odometer, means comprising a normally open electric circuit to control the operation of said odometer upon the closing of said circuit, means controlled by a light sensitive switch to partly close said circuit, and means actuated by said driving means to complete the closing of said circuit.

3. A meter of the type described comprising a circuit to control the actuation of said meter, a source of selected light, and light sensitive means to energize said circuit upon variation in light received by said light sensitive means beyond predetermined maximum and minimum limits.

4. A meter having registering means, time and distance actuated means for driving said registering means, a light sensitive element, and means actuated conjointly by said light sensitive means and said distance actuated means to place said time and distance actuated means in operative position to drive said registering means.

5. A meter having a travel actuated driving means and a clockwork driving means, a control switch having an inoperative and an operative position, means to move said control switch from inoperative to operative position, a circuit through said control switch to said control switch moving means and having two switches in series, means comprising a light sensitive element to close one of said switches, means actuated by said travel actuated driving means to close the other of said switches, and a circuit through said control switch in operative position to release said clockwork and actuate said meter from said travel actuated means.

6. A meter having a travel actuated driving means and a clockwork driving means, a control switch having an inoperative and an operative position, means to move said control switch from inoperative to operative position, a circuit through said control switch to said control switch moving means and having two switches in series, means comprising a light sensitive element to close one of said switches, means actuated by said travel actuated driving means to close the other of said switches, a circuit through said control switch in operative position to release said clockwork and actuate said meter from said travel actuated means, and means actuated with said control switch to register an initial charge in said meter.

7. A meter having a travel actuated driving means and a clockwork driving means, a control switch having an inoperative and an operative position, means to move said control switch from inoperative to operative position, a circuit through said control switch to said control switch moving means and having two switches in series, means comprising a light sensitive element to close one of said switches, means actuated by said travel actuated driving means to close the other of said switches, a circuit through said control switch in operative position to release said clockwork and actuate said meter from said travel actuated means, and manually operated means to stop said clockwork and to return said control switch to its initial position.

8. A meter having a travel actuated driving means and a clockwork driving means, a control switch having an inoperative and an operative position, means to move said control switch from inoperative to operative position, a circuit through said control switch to said control switch moving means and having two switches in series, means comprising a light sensitive element to close one of said switches, means actuated by said travel actuated driving means to close the other of said switches, a circuit through said control switch in operative position to release said clockwork and actuate said meter from said travel actuated means, a source of light, and manual means to interrupt the source of said light and to rotate the control switch to operative position.

9. A meter having a travel actuated driving means and a clockwork driving means, a control switch having an inoperative and an operative position, means to move said control switch from inoperative to operative position, a circuit through said control switch to said control switch moving means and having two switches in series, means comprising a light sensitive element to close one of said switches, means actuated by said travel actuated driving means to close the other of said switches, a circuit through said control switch in operative position to release said clockwork and actuate said meter from said travel actuated means, said clockwork driving means comprising a circuit opened and closed at periodic intervals, a solenoid energized and de-energized by the closing and opening of said circuit, and registering elements operated step by step by said solenoid.

10. A meter having a travel actuated driving means and a clockwork driving means, a control switch having an inoperative and an operative position, means to move said control switch from inoperative to operative position, a circuit through said control switch to said control switch moving means and having two switches in series, means comprising a light sensitive element to close one of said switches, means actuated by said travel actuated driving means to close the other of said switches, a circuit through said control switch in operative position to release said clockwork and actuate said meter from said travel actuated means, and means to project light through a space to be occupied and to said light sensitive element.

11. In combination, a meter, a source of light radiation of selected characteristics, a light sensitive element, a control circuit held in balanced condition by the selected radiation between maximum and minimum from said source on said element, and means actuated by said circuit when unbalanced to place said meter in operative condition.

12. In combination, a time and distance registering meter, a source of light radiation of selected characteristics, an electric circuit including a light sensitive element to receive light from said source, a switch held in balanced condition by the circuit containing said element, travel actuated driving means for said meter, and means controlled by said driving means when in motion and by said meter when unbalanced to place said meter in operating condition.

13. A meter for taxicabs and the like, means for setting said meter in registering condition, said means comprising a rotating switch, a motor to rotate said switch, a pair of starting contacts bridged by said switch in starting position, a circuit through said starting contacts and through said motor and having a pair of control switches in series, a light sensitive element controlling one of the switches of said pair, a meter driving element controlling the other switch of said pair, a pair of operating contacts bridged by said switch in operative position, and a circuit through said operating contacts to place said meter in operative condition.

14. A meter for taxicabs and the like, means for setting said meter in registering condition, said means comprising a rotating switch, a motor to rotate said switch, a pair of starting contacts bridged by said switch in starting position, a circuit through said starting contacts and through said motor and having a pair of control switches in series, a light sensitive element controlling one of the switches of said pair, a meter driving element controlling the other switch of said pair, a pair of operating contacts bridged by said switch in operative position, a circut through said operating contacts to place said meter in operative condition, a fare register, and a gear rotating with said rotating switch to rotate said register for an initial charge.

15. A meter for taxicabs and the like, means for setting said meter in registering condition, said means comprising a rotating switch, a motor to rotate said switch, a pair of starting contacts bridged by said switch in starting position, a circuit through said starting contacts and through said motor and having a pair of control switches in series, a light sensitive element controlling one of the switches of said pair, a meter driving element controlling the other switch of said pair, a pair of operating contacts bridged by said rotating switch in operative position, a circuit through said operating contacts to place said meter in operative condition, said meter having a clockwork actuating means, means controlled by said circuit to release said clockwork means, manually controlled means to stop said clockwork, and means controlled by said circuit and by said driving element to return said rotating switch to initial position when said manual means and said driving means are both actuated.

16. A meter for taxicabs and the like, means for setting said meter in registering condition, said means comprising a rotating switch, a motor to rotate said switch, a pair of starting contacts bridged by said switch in starting position, a circuit through said starting contacts and through said motor and having a pair of control switches in series, a light sensitive element controlling one of the switches of said pair, said second switch comprising a shifting gear to mesh with said driving means and a solenoid to shift said gear, a pair of operating contacts bridged by said switch in operative position, and a circuit through said operating contacts to place said meter in operative condition.

17. A meter for taxicabs and and the like, means for setting said meter in registering condition, said means comprising a rotating switch, a motor to rotate said switch, a pair of starting contacts bridged by said switch in starting position, a circuit through said starting contacts and through said motor and having a pair of control switches in series, a light sensitive element controlling one of the switches of said pair, a meter driving element controlling the other switch of said pair, a pair of operating contacts bridged by said switch in operative position, a circuit through said operating contacts to place said meter in operative condition, and a by-pass circuit through said motor between said starting and said operating contacts.

JOHN GARDNER.